United States Patent [19]
Shieh

[11] Patent Number: 5,732,729
[45] Date of Patent: Mar. 31, 1998

[54] SAFETY VALVE

[76] Inventor: Ming Don Shieh, No. 18, Tou Ren Lane, Tou Ren Li, Lu Gang Town, Chang Hua Hsien, Taiwan

[21] Appl. No.: 797,491

[22] Filed: Feb. 7, 1997

[51] Int. Cl.$^6$ .................................................. G05D 11/00
[52] U.S. Cl. ............... 137/100; 137/625.41; 137/87.04; 137/98
[58] Field of Search ............... 137/100, 98, 87.04, 137/625.41

[56] References Cited

U.S. PATENT DOCUMENTS

| | | | |
|---|---|---|---|
| 2,200,578 | 5/1940 | Mahon | 137/98 |
| 3,921,659 | 11/1975 | Rudewick | 137/625.41 |
| 5,501,244 | 3/1996 | Shahriar | 137/625.41 |

*Primary Examiner*—Denise L. Ferensic
*Assistant Examiner*—Ramyar Farid
*Attorney, Agent, or Firm*—Charles E. Baxley, Esq.

[57] ABSTRACT

A valve includes two outlet ports and two inlets communicating with a chamber and includes two valve seats. A membrane is secured in the chamber. Two plugs are slidably engaged in the inlets for engaging with the valve seats and each includes one end engaged with the membrane and the other end slidably engaged with a cap. Two springs are engaged between the plugs and the caps for balancing the membrane and the plugs. One of the plugs is forced to engage with the valve seat by water from the inlet when no water is supplied to the other inlet.

5 Claims, 4 Drawing Sheets

SAFETY VALVE

BACKGROUND OF THE INVENTION

1. Field of the Invention

The present invention relates to a valve, and more particularly to a valve having a safety mechanism.

2. Description of the Prior Art

Typical three-way valves comprise two inlets coupling to cold water and hot water respectively and an outlet communicating with the two inlets for receiving the cold water and hot water from the inlets simultaneously. However, when the cold water is cut-off suddenly or is turned off inadvertently, the hot water may still flow out and may hurt the users.

The present invention has arisen to mitigate and/or obviate the afore-described disadvantages of the conventional three-way valves.

SUMMARY OF THE INVENTION

The primary objective of the present invention is to provide a valve which includes a safety mechanism for preventing hot water from flowing out of the outlet without mixing with cold water.

In accordance with one aspect of the invention, there is provided a valve comprising a body including a chamber and two inlets communicating with the chamber and two outlet ports communicating with the chamber, the body including two valve seats formed in the inlets, a membrane secured in the chamber for separating the inlets from each other, two plugs slidably engaged in the inlets and adapted to engage with the valve seats respectively for blocking the inlets respectively, the plugs each including a first end engaged with the membrane and each including a second end, two caps engaged in the inlets and slidably engaged on the second ends of the plugs respectively and each including at least one hole for allowing water to flow into the inlets, and two biasing means engaged between the plugs and the caps for balancing the membrane and the plugs. A first of the plugs is forced to engage with a first of the valve seats by water from the first inlet when no water is supplied to a second of the inlets.

The plugs each includes a tapered surface for engaging with the valve seat and for blocking the inlet.

The body includes an upper portion having two stops, the valve includes a cartridge having a bottom portion and includes a disc secured to the bottom portion of the cartridge, the disc includes two curved oblong holes for engaging with the outlet ports and each having a gradually changed width for adjusting an opening size of the outlet ports and for adjusting an water outward flow through the outlet ports.

The cartridge includes two ears extended outward from the bottom portion and each having a puncture, the disc includes two lugs extended upward for engaging with the punctures of the ears and for allowing the disc to be rotated in concert with the cartridge.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

A similar safety valve was filed in a co-pending U.S. patent application which was filed on Jun. 28, 1995, with the Ser. No. 08/496,060. The co-pending application is taken as a reference of the present invention.

Figure 1:
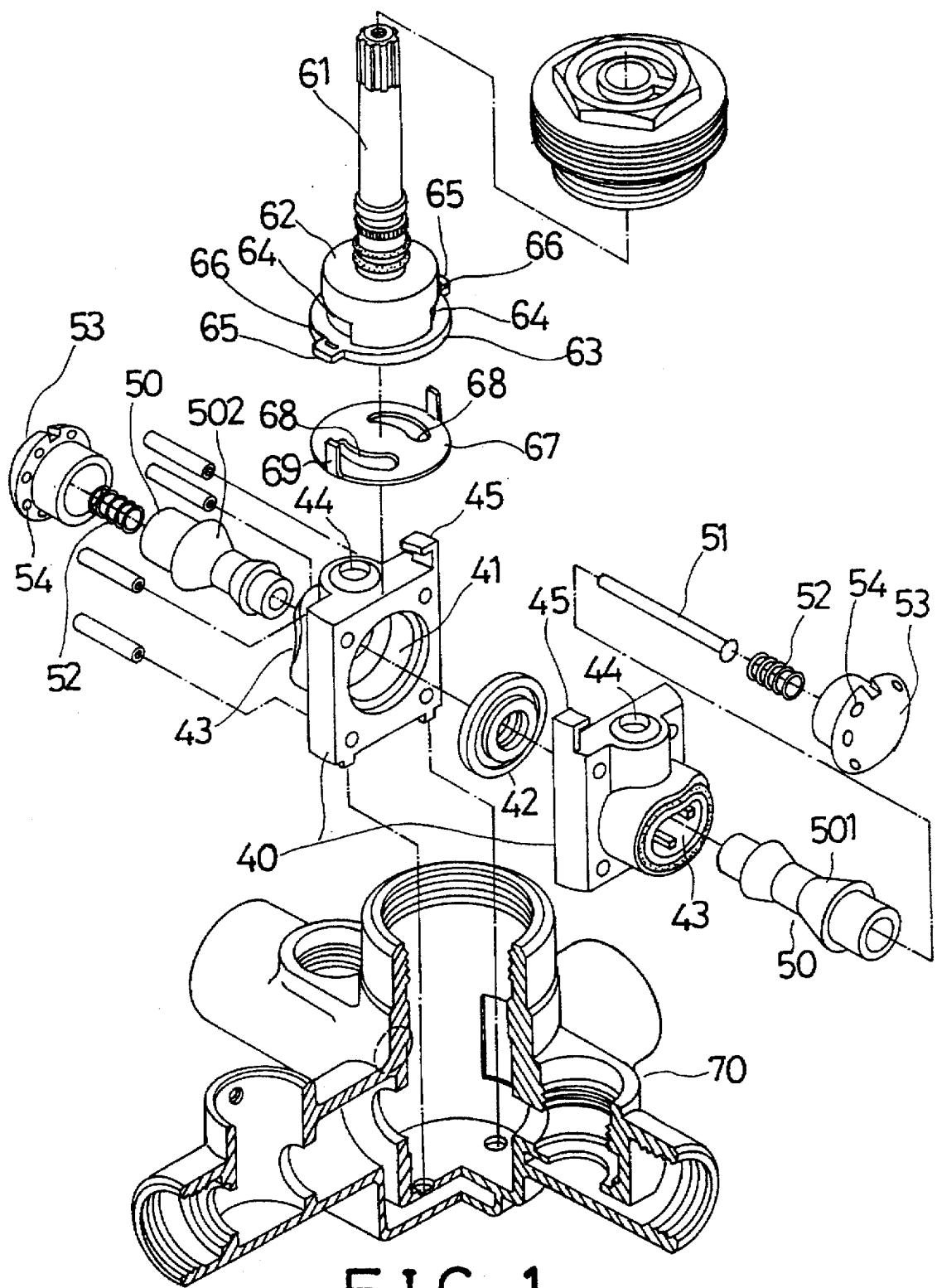
FIG. 1 is an exploded view of a safety valve in accordance with the present invention.
Figure 2:
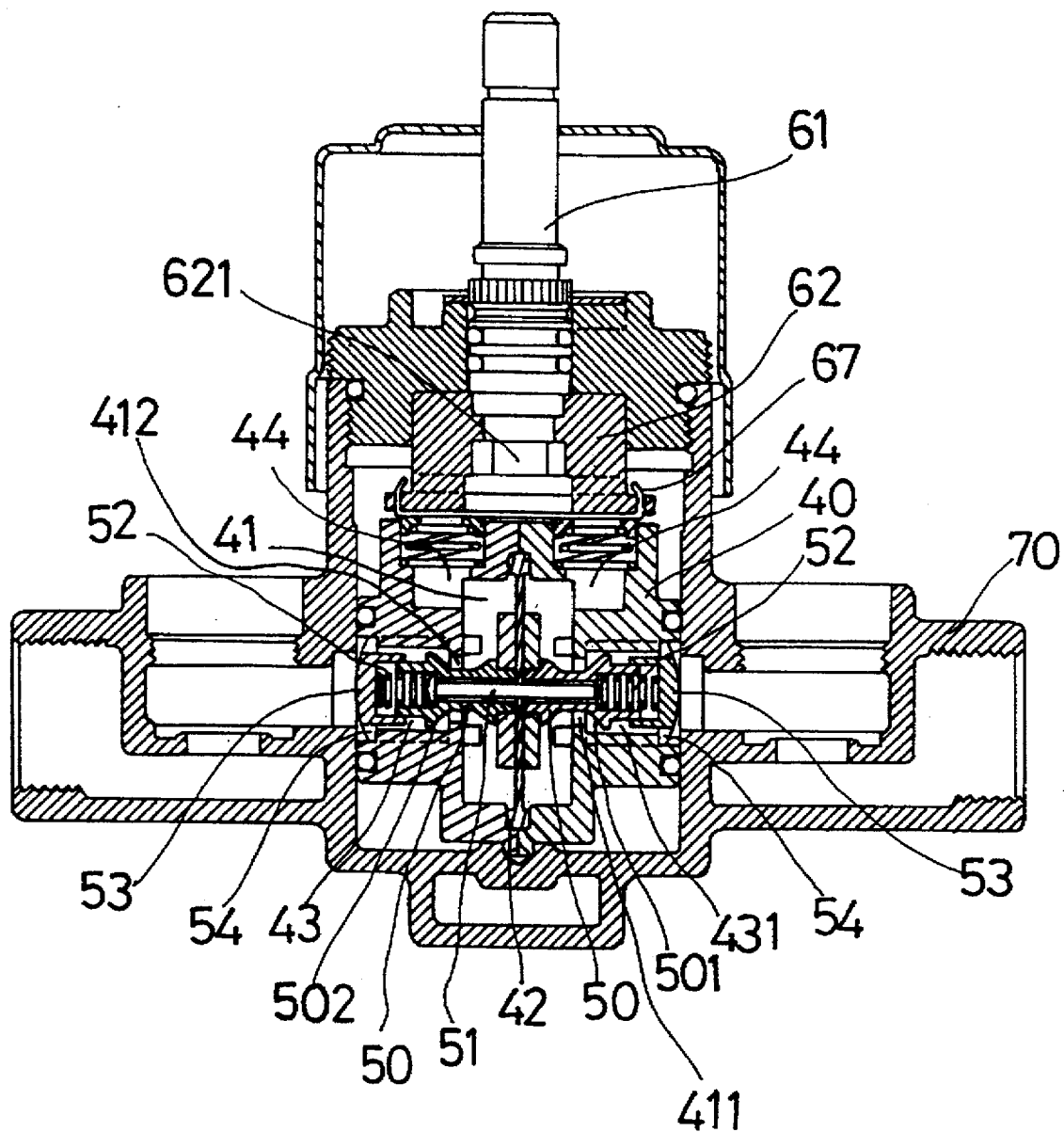
FIGS. 2 and 3 are cross sectional views of the safety valve illustrating the operation of the safety valve.

Referring to the drawings, and initially to FIGS. 1 and 2, a safety valve in accordance with the present invention comprises a body 40 formed by two half members and including a chamber 41 and two inlets 43, 431 communicating with the chamber 41 for receiving cold water and hot water respectively. The body 40 includes two valve seats 411, 412 formed in the inlets 43, 431. The body 40 includes an inner peripheral surface having an annular groove for securing the peripheral portion of a membrane 42 which separates the chamber 41 into two spaces for communicating with the inlets 43, 431 respectively. The body 40 includes two outlet ports 44 communicating with the chamber 41 and includes two stops 45.

Two plugs 50 are disposed in the inlets 43, 431 and each includes a first end engaged with the membrane 42 and each includes a tapered surface 501, 502 for engaging with the valve seats 411, 412 so as to block the inlets 43, 431. A pin 51 is secured in the plugs 50 for securing the plugs together. Two caps 53 are engaged in the inlets 43, 431 respectively and slidably engaged on the second ends of the plugs 50 and each includes a number of holes 54 for allowing water to flow into the inlets 43, 431. Two springs 52 are engaged between the plugs 50 and the caps 53 for balancing the plugs 50 and the membrane 42.

A cartridge 62 includes a space 621 and two passages 64 communicating with the space 621 and includes a peripheral flange 63 extended radially outward from the bottom portion for engaging with the stops 45 and for allowing the cartridge 62 to be rotated relative to the body 40. The cartridge 62 includes two ears 65 extended outward and each having a puncture 66. A disc 67 includes two lugs 69 extended upward for engaging with the puncture 66 of the cartridge 62 such that the disc 67 and the cartridge 62 rotate in concert with each other. The disc 67 includes two curved oblong holes 68 for engaging with the outlet ports 44. The curved oblong holes 68 each includes a width gradually increasing from a narrower end to a wider end for adjusting the opening size of the outlet ports 44 and for adjusting the outward flow through the outlet ports 44. The cartridge 62 includes a shaft 61 extended upward for securing a knob which may be used for rotating the cartridge 62 and the disc 67 so as to adjust the water flowing through the outlet ports 44.

Figure 3:
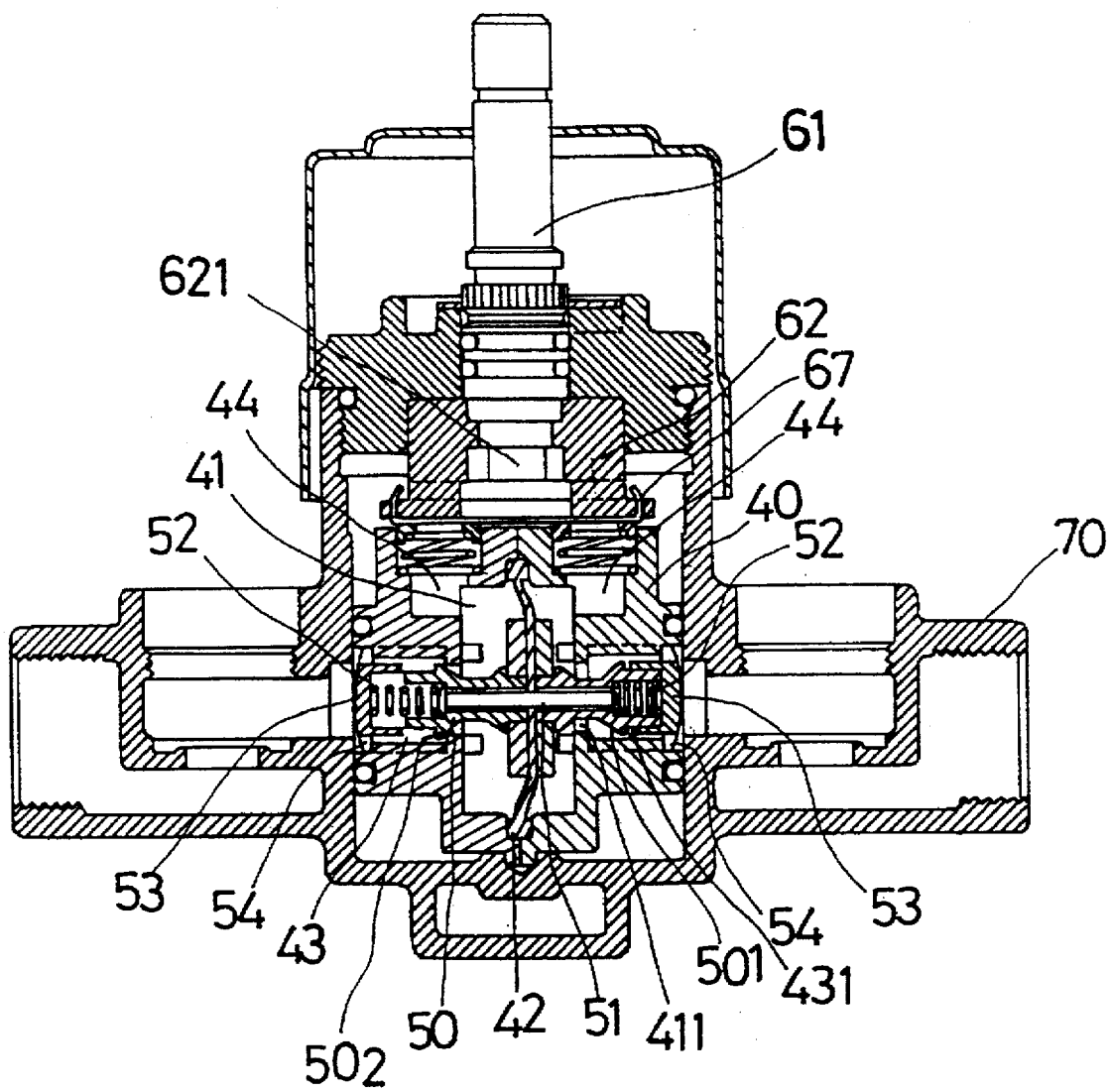

In operation, as shown in FIG. 3, for example, when the cold water from the inlet 431 is cut off, no water will flow into the inlet 431 such that no water pressure will apply onto the right side of the membrane 42. At this moment, the hot water from the inlet 43 may apply a force onto the left side of the membrane 42 in order to force the plugs 50 rightward against the right spring 52, such that the tapered surface 502 of the left plug 50 may be forced to engage with the valve seat 412 in order to cut off the hot water and in order to prevent the hot water from hurting the users.

Figure 4:
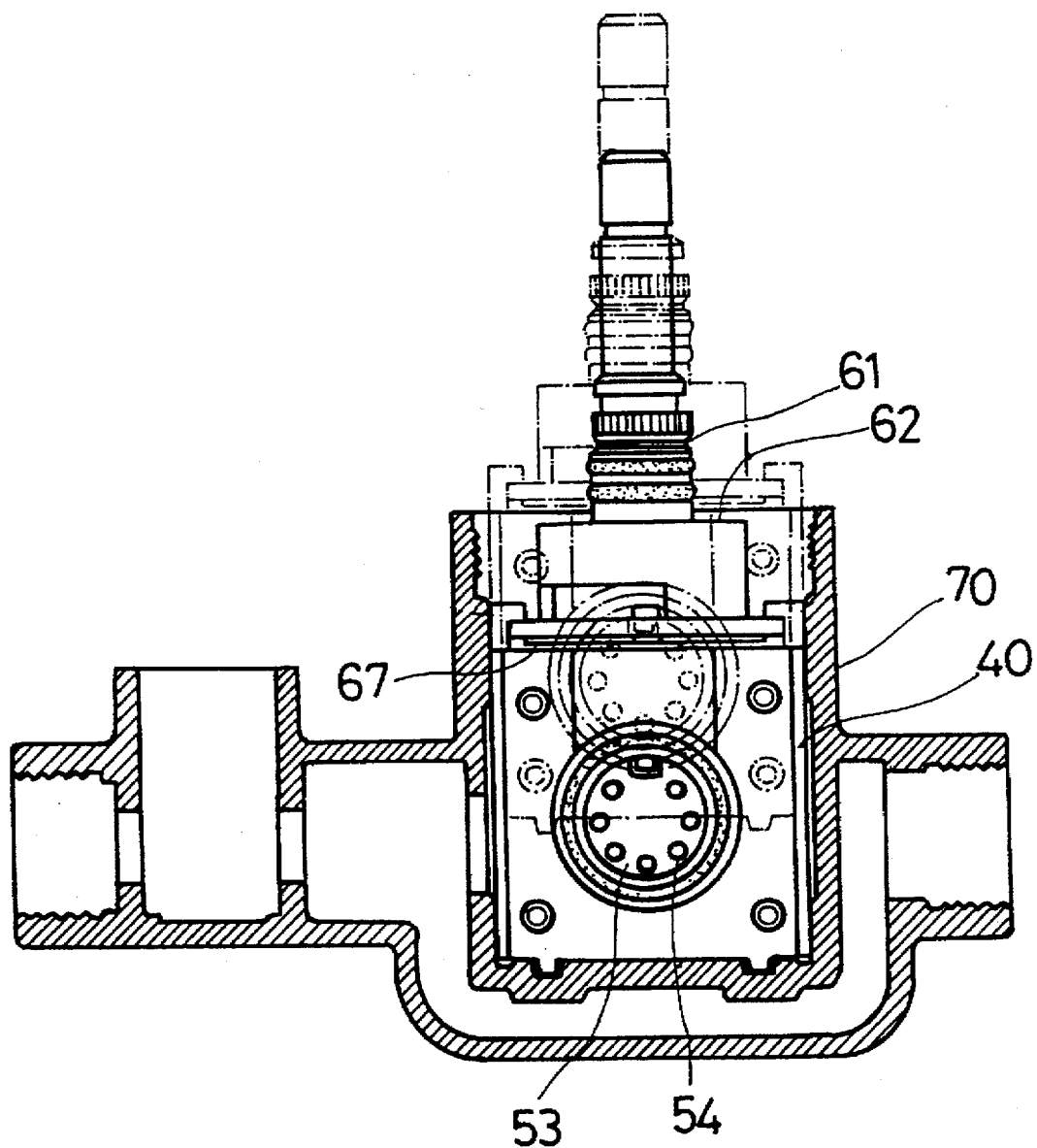
FIG. 4 is a partial cross sectional view illustrating the assembling of the safety valve.

As shown in FIG. 4, the body 40 and the cartridge 62 may be assembled together before engaging into the faucet body 70 such that the control mechanism may be easily engaged and assembled into the faucet body 70.

Accordingly, the safety valve in accordance with the present invention includes two plugs that may block one of the inlets when the water from the other inlet is cut off, in order to prevent the users from being hurt by hot water.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve comprising:

a housing, a body disposed within said housing and including a chamber and two inlets communicating with said chamber and two outlet ports communicating with said chamber, said body including two valve seats formed in said inlets, a membrane secured in said chamber for separating said inlets from each other, two plugs slidably engaged in said inlets and adapted to engage with said valve seats respectively for blocking said inlets respectively, said plugs each including a first end engaged with said membrane and each including a second end, two caps engaged in said inlets and slidably engaged on said second ends of said plugs respectively, said caps having first and second surfaces wherein the first surface engages the housing and the second surface engages the body, each cap including at least one hole extending from the first surface to the second surface for allowing water to flow into said inlets from said housing, and two coil springs engaged between said plugs and said caps for balancing said membrane and said plugs, a first of said plugs being forced to engage with a first of said valve seats by water from said first inlet when no water is supplied to a second of said inlets.

2. A valve according to claim 1, wherein said plugs each includes a tapered surface for engaging with said valve seat and for blocking said inlet.

3. A valve according to claim 1, wherein said body includes an upper portion having two stops, said valve includes a cartridge having a bottom portion and includes a disc secured to said bottom portion of said cartridge, said disc includes two curved oblong holes for engaging with said outlet ports and each having a gradually changed width for adjusting an opening size of said outlet ports and for adjusting a water outward flow through said outlet ports.

4. A valve according to claim 3, wherein said cartridge includes two ears extended outward from said bottom portion and each having a puncture, said disc includes two lugs extended upward for engaging with said punctures of said ears and for allowing said disc to be rotated in concert with said cartridge.

5. A valve according to claim 1, further comprising a pin engaged in said plugs for securing said plugs together.

* * * * *